US009467866B2

(12) United States Patent
Gao et al.

(10) Patent No.: US 9,467,866 B2
(45) Date of Patent: Oct. 11, 2016

(54) CENTRALIZED CONTROL SHARING OF SPECTRUM FOR COEXISTENCE OF WIRELESS COMMUNICATION SYSTEMS IN UNLICENSED BANDS (75) Inventors: Xinying Gao, Beijing (CN); Na Wei, Beijing (CN); Haiming Wang, Beijing (CN); Juho Mikko Oskari Pirskanen, Kangasala (FI)

(73) Assignee: BROADCOM CORPORATION, Irvine, CA (US)

( * ) Notice: Subject to any disclaimer, the term of this patent is extended or adjusted under 35 U.S.C. 154(b) by 38 days.

(21) Appl. No.: 14/365,167

(22) PCT Filed: Dec. 15, 2011

(86) PCT No.: PCT/CN2011/002110
§ 371 (c)(1),
(2), (4) Date: Jun. 13, 2014

(87) PCT Pub. No.: WO2013/086659
PCT Pub. Date: Jun. 20, 2013

(65) Prior Publication Data
US 2014/0301351 A1 Oct. 9, 2014

(51) Int. Cl.
*H04W 16/14* (2009.01)
*H04W 74/08* (2009.01)
*H04W 52/24* (2009.01)

(52) U.S. Cl.
CPC ........... *H04W 16/14* (2013.01); *H04W 52/244* (2013.01); *H04W 74/08* (2013.01)

(58) Field of Classification Search
CPC .. H04W 16/14; H04W 52/244; H04W 74/08
See application file for complete search history.

(56) References Cited

U.S. PATENT DOCUMENTS

| 6,512,928 | B1 | 1/2003 | Janky et al. |
| 2006/0148482 | A1* | 7/2006 | Mangold ....................... 455/450 |
| 2006/0223448 | A1* | 10/2006 | Kruys ............................ 455/69 |
| 2012/0300712 | A1* | 11/2012 | Hakola et al. ................ 370/329 |

FOREIGN PATENT DOCUMENTS

| CN | 101800623 | 8/2010 |
| CN | 102104401 | 6/2011 |

* cited by examiner

*Primary Examiner* — Ayaz Sheikh
*Assistant Examiner* — Debebe Asefa
(74) *Attorney, Agent, or Firm* — Oblon, McClelland, Maier & Neustadt, L.L.P (57) ABSTRACT In one embodiment information is received from one or more wireless networks indicating a request for a listen before transmit mode or a non-listen before transmit mode. In reply it is determined whether the one or more wireless networks is to utilize the listen before transmit mode or the non-listen in an unlicensed frequency band and the one or more wireless networks are informed of the determined mode. Centralized control of spectrum for coexistence of wireless communication systems in unlicensed bands according to exemplary embodiments of the invention can be performed by an enhanced coexistence manager or a network access node with information obtained from one or more base stations or user equipment.

20 Claims, 6 Drawing Sheets

CENTRALIZED CONTROL SHARING OF SPECTRUM FOR COEXISTENCE OF WIRELESS COMMUNICATION SYSTEMS IN UNLICENSED BANDS

TECHNICAL FIELD

The exemplary and non-limiting embodiments of this invention relate generally to wireless communication systems, methods, devices and computer programs, and more specifically relate to centralized control of spectrum for coexistence of wireless communication systems in unlicensed bands.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

The following abbreviations that may be found in the specification and/or the drawing figures are defined as follows:

3GPP third generation partnership project
AP access point
AFH adaptive frequency hopping
BLER block error rate
BS base station
CA carrier aggregation
CC component carriers
CCA clear channel assessment
CM coexistence manager
COT channel occupancy time
CQI channel quality indicator
CSMA carrier sense multiple access
DAA detect and avoid
eNodeB base station of a LTE/LTE-A system
ETSI European Telecommunications Standards Institute
FCC federal communications commission
FHSS frequency hopping spread spectrum
ID identifier
IEEE Institute for Electrical and Electronics Engineers
IP Internet protocol
ISM industrial, scientific and medical
LBT listen-before-talk
LBTx listen-before-transmit
LTE long term evolution (of the evolved UTRAN system)
LTE-A long term evolution-advanced
MAC medium access control
Non-LBT non-listen-before-talk
Non-LBTx non-listen-before-transmit
PCell primary serving cell
RAT radio access technology
RRC radio resource control
SCells secondary serving cells
SIB system information block
TV WS television white spaces
UE user equipment
UTRAN universal terrestrial radio access network
WLAN wireless local area network The capacity of wireless networks has consistently increased over the last decade due an increase in numbers of wireless users utilizing those networks. In addition, network capacity is on the rise due to the ever-increasing volume of content rich data (i.e. streaming HD video) transmitted and received on wireless networks. To accommodate this increase in capacity, network operators as well as manufacturers of user handsets and network equipment will in the near future seek to deploy $4^{th}$ Generation (4G) wireless networks according to the Long Term Evolution-Advanced (LTE-A) standard. LTE-A cellular networks will require minimum support of 1 Gbps and 100 Mbps peak rates for low-mobility and high-mobility users, respectively. Hence, network operators, as well as manufacturers of user handsets and network equipment, seek methods, devices and computer programs to handle increase capacity on wireless networks to avoid congestion.

Radio access technology (RAT) deployed in legacy $3^{rd}$ Generation (3G) wireless networks as well as LTE/LTE-A networks conventionally transmit and receive wireless communications on licensed frequency spectrum in limited spectral bands designated according to the country in which they operate. Obtaining the licensed frequency spectrum involves significant costs. Accordingly, wireless network operators compete to purchase licensed frequency spectrum to accommodate users and their data based upon the network capacity to avoid congestion.

To control costs and to avoid congestion, network operators, as well as manufacturers of user handsets and network equipment, have sought to off-load some wireless traffic to non-cellular networks. For example Internet traffic can be offloaded to available WLAN whose access points provide access to the Internet. This source alone is not expected to fully offset predicted increases in wireless data traffic as well as meet the above stated minimum peak data rates under LTE-A.

Another approach to address congestion in 4G wireless networks, such as cellular core networks in LTE-A, is to off-load traffic on available unlicensed frequency spectrum. This approach takes advantage of so-called Carrier aggregation (CA) undergoing development for the LTE/LTE-A systems. In CA, the whole system bandwidth is carved into multiple groupings of "component carriers" (CCs), each up to 20 MHz, so that LTE-A devices are able to use wider bandwidth of up to 100 MHz, while at the same time allowing LTE devices to continue viewing the spectrum as separate component carriers. Specific for LTE/LTE-A, each user equipment (UE) is to be assigned one primary serving cell (PCell) which remains active and one or more secondary serving cells (SCells) which may or may not be active at any given time, depending on data volume for the UE and traffic conditions in the serving cell. At least one CC in the system is to be backward compatible with UE's which are not capable of CA operation.

These non-licensed frequency spectrum or licensed-exempt bands vary by region and typically are allocated to frequency bands such as 315-470 MHz, 868-870 MHz, 902-928 MHz and referred to as the Industrial, Scientific and Medical bands (ISM). Additional unlicensed frequencies were opened in 2008 in the United States by the Federal Communication Commission. Those newly opened unlicensed frequencies where unused broadcast TV spectrum allocated at 300 MHz to 400 MHz (so-called "TV white space"). Another popular and internationally designated licensed-exempt band is the 2.4 GHz frequency band which actual covers wireless operations in the 2400-2483.5 MHz frequency range. The 2.4 GHz frequency band often hosts for standardized and proprietary protocols such as IEEE 802.11b/a/g/n/ac, WiFi, Bluetooth®, or ZigBee™.

Operation on the unlicensed 902-928 MHz and 2.4 GHz frequency bands are subject to regulation or possible future adherence to standardization depending upon the region of operation. These regulation or standardization seeks to manage co-existence in the unlicensed bands to provide spectrum access to facilitate spectrum sharing among varying equipment. For example, in the United States operations in the 2400-2483.5 MHz frequency range must adhere to Title 47, Telecommunication, Chapter 1, Part 15, radio devices as introduced by the Federal Communications Commission in 2001. According to that regulation, operations in the 2400-2483.5 MHz frequency range must employ frequency hopping spread spectrum (FHSS) with at least 75 hopping frequencies and at different transmission power levels. According to FCC part 15.247, channel carrier frequencies are separated by a minimum of 25 kHz or a 20 dB bandwidth of a hopping channel, whichever is greater. Also required is a maximum 20 dB bandwidth of the hopping channel which is 1 MHz. The average time of occupancy cannot be greater than 0/0.4 seconds within a 30 second period. Moreover, hopping tables are required to have a pseudo-randomly ordered list of hopping frequencies and each frequency must be used equally on the average by each transmitter.

In Europe, currently under consideration before the European Telecommunications Standards Institute (ETSI), is a more stringent requirement for radio systems co-existent in the 2.4 GHz frequency band. Under this proposed standard opportunistic spectrum sharing would be required to employ adaptive frequency hopping (AFH) (or wide band modulation other than FHSS) equipment employ a detect and avoid (DAA) mechanism which would allow user equipment to adapt to its environment by identifying frequencies that are being used by other equipment.

One DAA mechanism using LBT operates by designating a hopping frequency 'unavailable' when a signal is detected prior any transmission on that frequency. In particular, at the start of every dwell time, before transmission on one of fifteen (15) hopping frequencies, the equipment performs a clear channel assessment (CCA) to detect for energy. The observation time is less than 0.2% of a channel occupancy time (COT) with a minimum of 20 μs. Accordingly, if the user equipment finds the hopping frequency clear transmissions can commence. On the other hand, if a signal is present with a level above a detection threshold the hopping frequency is designated unavailable. The detection threshold is required to be proportional to the transmit power of the transmitter. For example, given a 20 dB transmitter, the detection threshold level is equal or lower that 70-dB/MHz at the input to the receiver (assuming 0 dB receiving antenna). The removal of a hopping frequency by designating it unavailable requires adding a hopping frequency to maintain the fifteen (15) hopping frequencies.

Such, a DAA mechanism provides that control over access to radio resources is distributed among the radio systems, so that those radio systems can achieve a fair sharing of radio resources to some extent.

Alternatively, adaptive frequency hopping equipment can employ a different DAA mechanism. These mechanisms operate by designating a hopping frequency 'unavailable' when interference is detected during transmissions on that frequency. In particular, during normal operation, the equipment evaluates the presence of a signal on each of available fifteen (15) hopping frequencies. If a signal is present with a level above the detection threshold the hopping frequency is designated "unavailable." The detection threshold is required to be proportional to the transmit power of the transmitter. For example, given a 20 dB transmitter, the detection threshold level is equal or lower that 70-dB/MHz at the input to the receiver (assuming 0 dB receiving antenna). The removal of a hopping frequency by designating it unavailable requires adding a hopping frequency to maintain fifteen (15) hopping frequencies.

The frequency designated unavailable remains unavailable for a minimum time equal to 1 second or 5 times the actual number of hopping frequencies multiplied with the channel occupancy time (COT) whichever is longer. No transmission occurs during this time period that the hopping frequency is designated unavailable. After the expiration of this time period of unavailability, the hopping frequency may be evaluated as an 'available' frequency.

DAA mechanisms can also employ a wide band modulation other than FHSS. In such a mechanism, a channel is required to be designated unavailable if interference is reported after transmission on that channel. The modulation technique complies with the above non-LBT AFH requirements with the except that a channel must remain unavailable for a minimum time equal to 1 s after which the channel may be considered again as an 'available' channel.'

Figure 1:
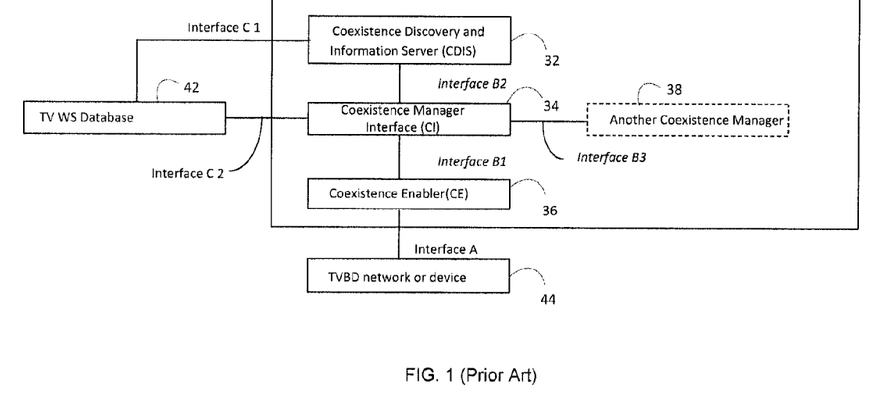
FIG. 1 illustrates the architecture for a coexistence manager as set forth in IEEE 802.19.1.

One conventional RAT-independent approach to manage coexistence on the TV WS band is by way of a coexistence manager (CM), whose architecture is set forth by IEEE 802.19 Task group 1 and shown at FIG. 1. The CM is a higher layer function which operates on top of the radio access technologies. As shown in FIG. 1, the coexistence manager interface (CMI) 34 is coupled to a coexistence discovery and information server (CDIS) 32 which collects information on interference levels on the 300-400 MHz frequency band from a TW WS database 42. Also included is a coexistence enabler (CE) 36 which determines which frequency bands in the 300-400 MHz frequency band are available for use by a network or a user device. Information can also be shared with other coexistence managers 38. With the help of the CM, IEEE networks can negotiate the spectrum utilization on the TV WS band between each other or submit to the control of a CM which locally governs the spectrum utilization for the shared spectrum.

SUMMARY

In a first exemplary embodiment of the invention there is an apparatus comprising at least one processor and at least one memory storing a computer program. In this embodiment the at least one memory with the computer program is configured with the at least one processor to cause the apparatus to at least: receive information from one or more wireless networks indicating a request for listen before transmit mode or a non-listen before transmit mode, in reply, determine whether the one or more wireless networks is to utilize the listen before transmit mode or the non-listen in an unlicensed frequency band and inform the one or more wireless networks of the determined mode.

In a second exemplary embodiment of the invention there is a method comprising: receiving information from one or more wireless networks indicating a request for listen before transmit mode or a non-listen before transmit mode, in reply, determining whether the one or more wireless networks is to utilize the listen before transmit mode or the non-listen in an unlicensed frequency band, and informing the one or more wireless networks of the determined mode.

In a third exemplary embodiment of the invention there is a computer readable memory storing a computer program, in which the computer program comprises: code for, receiving information from one or more wireless networks indicating a request for listen before transmit mode or a non-listen before transmit mode, code for in reply, determining whether the one or more wireless networks is to utilize the listen before transmit mode or the non-listen in an unlicensed frequency band, and code for, informing the one or more wireless networks of the determined mode.

In a fourth exemplary embodiment of the invention there is an apparatus comprising at least one processor and at least one memory storing a computer program. In this embodiment the at least one memory with the computer program is configured with the at least one processor to cause the apparatus to at least: collect information about transmissions in an unlicensed frequency band, based on the collected information, select between a listen before transmit mode and non-listen before transmit mode, and inform at least one use equipment of the selection mode for use in the unlicensed frequency band.

In a fifth exemplary embodiment of the invention there is a method comprising: collecting information about transmissions in an unlicensed frequency band, based on the collected information, selecting between a listen before transmit mode and non-listen before transmit mode, and informing at least one use equipment of the selected mode for use in the unlicensed frequency band.

In a sixth exemplary embodiment of the invention there is a computer readable memory storing a computer program, in which the computer program comprises: code for, collecting information about transmissions in an unlicensed frequency band, based on the collected information, selecting between a listen before transmit mode and non-listen before transmit mode, and code for, informing at least one use equipment of the selected mode for use in the unlicensed frequency band.

BRIEF DESCRIPTION OF THE DRAWINGS

The foregoing and other aspects of exemplary embodiments of this invention are made more evident in the following Detailed Description, when read in conjunction with the attached Drawing Figures.

DETAILED DESCRIPTION

Exemplary embodiments of the present invention described below disclose a method, apparatus and computer program which control or coordinate coexistence of an LTE-A device operating on the unlicensed frequency bands to share spectrum utilization with non-LTE-A devices. In exemplary embodiments of the invention disclosed herein, it is desirable to utilize unlicensed frequencies bands such as the 300-400 MHz, 902-928 MHz and 2.4 GHz frequency bands. However, other unlicensed frequencies bands currently available can also be utilized. In addition, in the event that other frequency bands are designated as unlicensed they too can be utilized in exemplary embodiments of the invention.

As described below in more detail, a novel and enhanced coexistence manager (eCM) is disclosed which adaptively select a listen-before-transmit (LBTx) and non-listen-before-transmit (non-LBTx) mode for carrying out shared communications on the unlicensed frequency band. LBTx mode as used throughout this disclosure is defined as a detect and avoid mechanism, method or mode of operation which prevents a device (such as a user equipment) from sending data on the unlicensed frequency band without first checking to determine if another device is not already utilizing that specific spectrum. Non-LBTx mode, on the other hand is a mechanism, method or mode of operation which allows a device such as user equipment to initially send data on the unlicensed frequency band for a brief period of time. After the elapse of the brief period of time, a determination is made if interference is present indicating the presence of other devices on the same unlicensed frequency band. In the event that interference is present further transmission of data discontinues for a period of time on that unlicensed frequency band. In exemplary embodiments of the invention, when non-LBTx mode is employed, a channel quality indicator (CQI) is disabled and no CQI reports are sent from the UEs to the eNBs.

Figure 2:
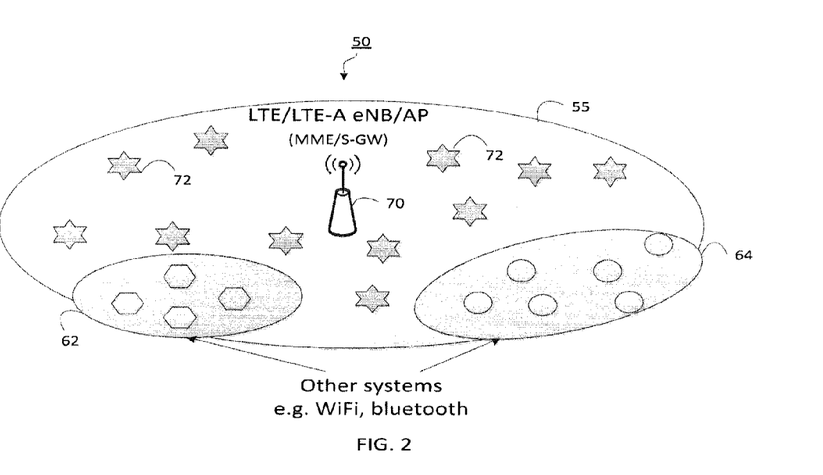
FIG. 2 is an illustration of a macrocell with an enhanced coexistence manager deployed according to an exemplary embodiment of the invention.

The enhanced coexistence manager (eCM) provides a higher layer centralized coordinator to manage all LTE/LTE-A systems operating in unlicensed frequency bands in a macro cell. The eCM can be deployed in the core network of the an LTE-A wireless network (i.e. mobility management entity MME) as described below and shown in FIG. 7. The function of the eCM may reside in the physical eNB or in a separate server having a communication link with the eNB, or in an access node of a different RAT, or in some higher node of a LTE or other RAT network. FIG. 2 is an illustration of a macro cell 55 with an eCM 70 deployed according to one exemplary embodiment of the invention. As shown in FIG. 2, several UEs 72 are shown each capable of employing a DAA mechanism using LBT or non-LBT mode. Also operating in the macrocell's range are other wireless communication systems such as wifi devices 62 or Bluetooth devices 64, each transmitting in the unlicensed frequency band.

Figure 3:
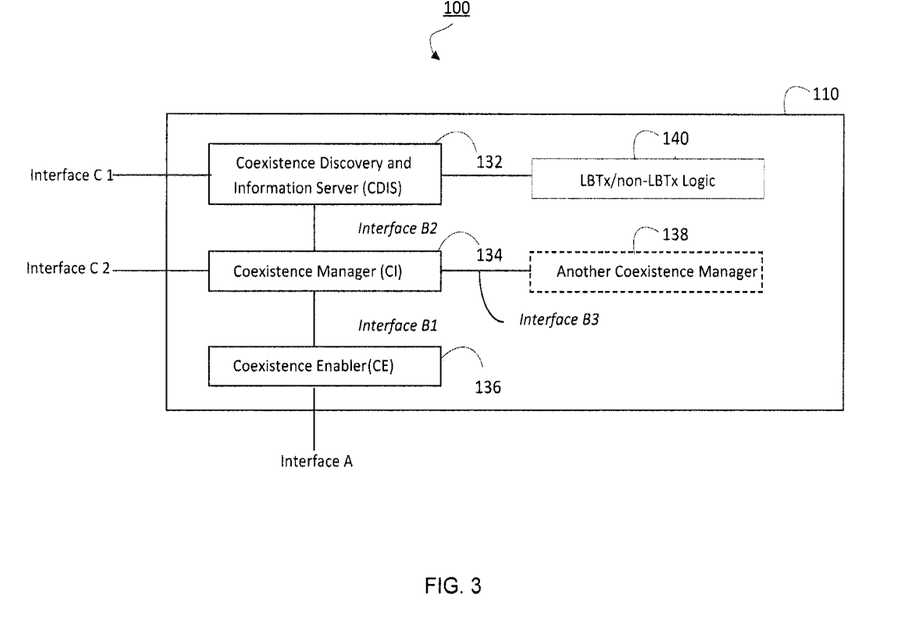
FIG. 3 is a block diagram of an enhanced coexistence manager in accordance with an exemplary embodiment of this invention.

FIG. 3 shows a block diagram of an enhanced coexistence manager 100. The enhanced coexistence manager interface (CMI) 134 is coupled to a coexistence discovery and information server (CDIS) 132 which collects information from external sources such as a TV WS database (not shown) and from one or more eNBs and/or one or more UEs. The eCM contains LBTx/non-LBTx decisional logic 140 utilized to determine whether LBTx or non-LBTx mode is employed on unlicensed frequency bands by one or more UEs. Also included is a coexistence enabler (CE) 136 which determines which frequency bands are available for use by a network (such as a MME) or a user device. The enhanced CM can determine if any unlicensed frequency spectrum in available, such as the ISM frequency bands (i.e. 315-470

MHz, 868-870 MHz, 902-928 MHz) or the 2.4 GHz frequency band. Information can also be shared with other coexistence managers 138.

Referring back to FIG. 2, in this embodiment, each UE 72 sends request signaling to the eCM 70 containing information about the eNB's mode selection (i.e. preference for LBTX or non-LBTx mode) and the location of the user equipment in the macro cell 55. Other information can be provided such as the modulation scheme employed in the case where the UE 72 requests non-LBTx. The eCM 70 collects this mode selection and location information from each UE 72 in the macro cell. In addition, the eCM discovers if there are coexisting radio systems operating in the unlicensed frequency band in the macro cell's neighborhood (i.e. wifi devices 330 and Bluetooth devices 340). After collecting this information the eCM 70 makes a mode election designating the use of LBTx or non-LBTx mode. After making the mode election, the eCM 70 transmits instructions back to each UE 72 through an eNB on the allowed mode, (i.e. LBTx, non-LBTx and/or modulation scheme) as well as the resource allocation on the unlicensed frequency band for each UE 72 in the macro cell 55. Thereafter, each UE 72 performs the elected mode as instructed by the eCM 70 and commands each LTE terminal to do so, on the allocated resources in the unlicensed frequency band/unlicensed SCell.

Figure 4:
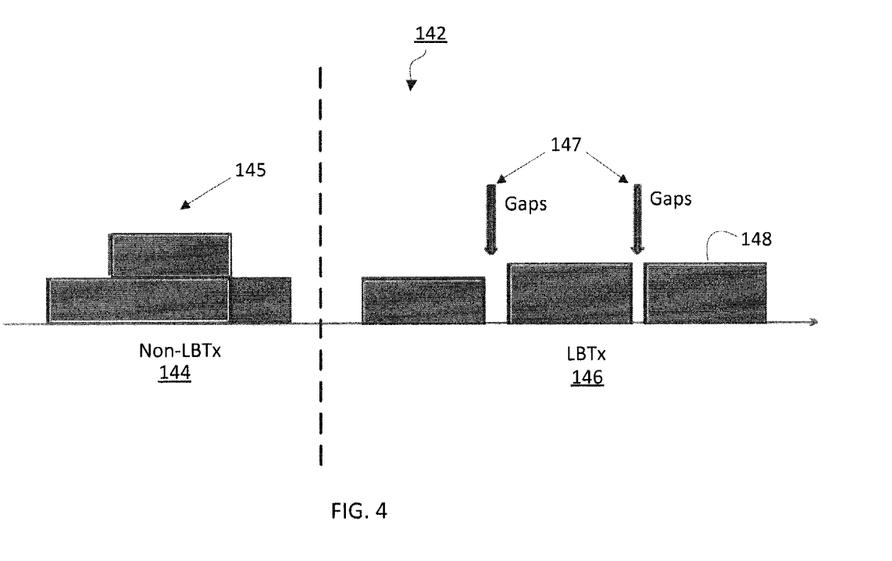
FIG. 4 is an illustration of an eNB's measurements over time on power level in accordance with an exemplary embodiment of this invention.

In another exemplary embodiment (such as where an eCM is not present), each eNB can be configured to make proactive measurements on the transmission pattern of wireless systems coexisting on unlicensed frequency bands and in range of the eNB. For example as shown in FIG. 4 an eNB configured according to an exemplary embodiment can take measurements on power level variation over time on unlicensed frequencies bands 142. The eNB might observe a consistent power level and gaps 147 in between transmissions 148 on the unlicensed frequency bands. In this case, the eNB would determine that the wireless system is using LBTx mode (146). On the other hand, if the eNB observes power variations and no gaps in the unlicensed frequency band 145, the eNB would determine that the neighbor wireless system is employing non-LBTx mode 144. Based on those measurements, the eNB would elect a mode for use. This election would be based upon the predominate mode in use to avoid collisions. Thereafter, the eNB would pass along mode instructions for transmitting in the unlicensed frequency band to all its UEs, by RRC or MAC signaling. Each UE receiving this signaling would also perform as follows. If the mode configuration is LBTx, the UE will perform the LBTx spectrum sharing mechanism, and will implicitly use CQI mode configured to support fast link adaptation. On the other hand, if the mode configured is non-LBTx, the LTE UE will perform the non-LBTx spectrum sharing mechanism, and will implicitly disable CQI mode configured or only use wideband CQI.

In an alternative embodiment, the eNB can be configured to perform an alternative reactive approach in the case where the eNB does not have the capability to measure transmission patterns in the unlicensed frequency bands as described above. In this alternative embodiment, the eNB may configure each UE to operate in a certain mode LBTx or non-LBTx, then based on the performance experienced in the LBTx or non-LBTx mode may subsequently change from LBTx to non-LBTx mode or from non-LBTx to LBTx mode. The performance can be measured over a defined time window T where the eNB may make a determination of the accuracy of the CQI and adapt accordingly to another mode in the next period T+1 should the CQI not be accurate. In particular, during operation the eNB may observe the CQI is accurate or not from the actually perceived BLER compared to target BLER for link adaptation. If the fast link adaptation works well, the eNB may continue with the LBT mode. If the fast link adaptation is observed to perform poorly in this predefined window T, the eNB may send mode reconfiguration signaling to switch the LTE user operating in the unlicensed frequency band to non-LBTx mode from the start of the next window T+1.

For both alternatives, the eNB could broadcast the mode selection configuration and reconfiguration information in a system information block (SIB), which could be similar to a WiFi's beacon transmission with certain periodicity. Or the eNB may send dedicated RRC/MAC signaling to the group of unlicensed band capable UEs via licensed/cellular transmissions.

Figure 5:
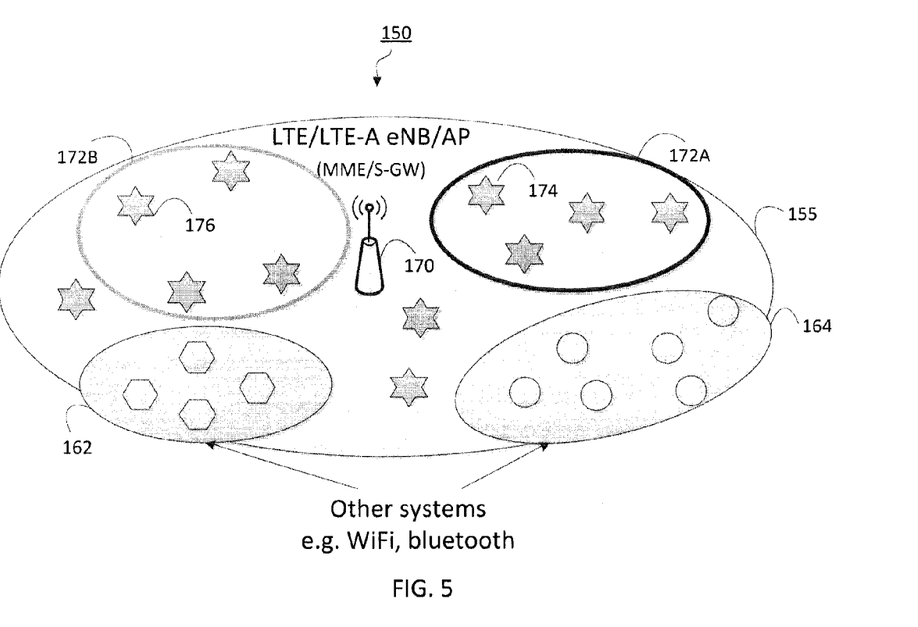
FIG. 5 is an illustration of an eNB configure with all or some UEs to perform measurements of power level variations over time in the unlicensed frequency band in accordance with the exemplary embodiments of this invention.

In yet another exemplary embodiment of the invention, the eNB may configure all or some UEs to perform measurements of power level variations over time in the unlicensed frequency band 150 as described and shown in FIG. 5. In this embodiment, each UE 174/176 would make an estimation based on its own measurement, and report to the eNB 170. The reporting could be recorded periodically, or event driven. The event driven reporting would be triggered when a neighboring wireless system's changes transmission mode. Ultimately, it is desirable in this embodiment to make the final decision regarding use of the LBTx or non-LBTx mode for certain groups of UEs based upon information reported to the eNB from each UE. In addition, the final decision takes into account the other systems operating in the macrocell such as wife devices 162 and Bluetooth devices 164. This embodiment would therefore allow for different sharing mechanism for different user groups. This is illustrated in FIG. 6 where one group of UEs 174 are employing LBTx 172A while another group of UEs 176 are employing non-LBTx 172B. Alternatively, the eNB could elect a mode selection based on the common agreed mode by the majority of terminals.

The above embodiments may also be combined as follows. The eNB may select the LBTx or non-LBTx mode as described above based upon its own measurement or a measurement made by each UE and reported to the eNB. If the eCM is available this will be the preferred mode where the eNB indicates to the eCM in its request signaling. If the eCM is not available the eNB will configure its UEs to implement this selected mode. Moreover, the eNB will learn which resources on the unlicensed Scell to allocate to its users from a TV WS database or other database containing information on available unlicensed spectrum.

In each embodiment described above, it is desirable that all the LTE/LTE-A transmissions follow the regulatory or standard requirement designated by the controlling authority in the country of operation (i.e. FCC or ETSI or other agency or adopted standard or regulation) on number of hopping channels, power levels, utilization duration, channel idle duration and maximum channel occupancy time.

Figure 6A:
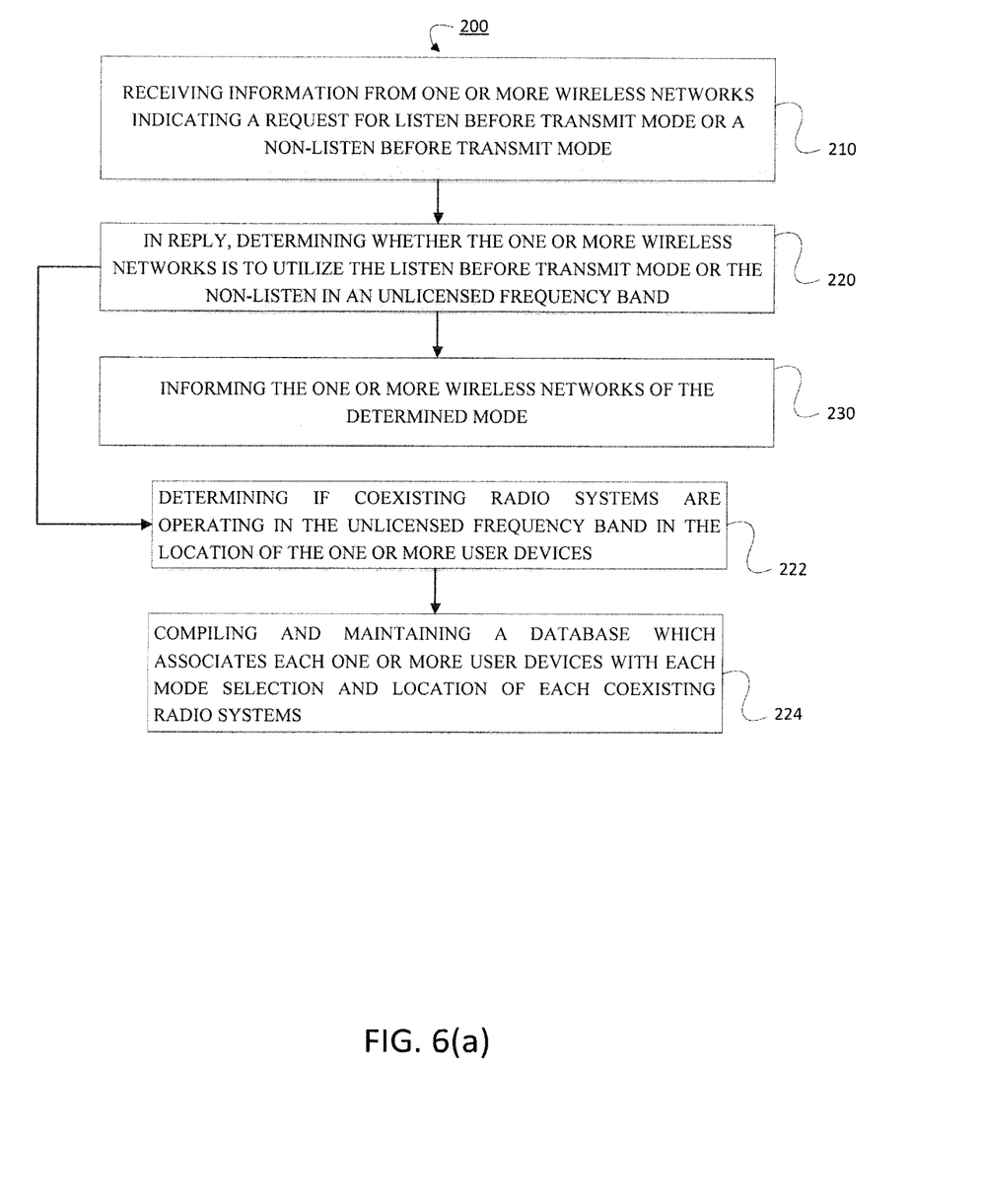
FIGS. 6(a) and 6(b) are logic flow diagrams that illustrate the operation of a method, and a result of execution of computer program instructions embodied on a computer readable memory, in accordance with the exemplary embodiments of this invention.
Figure 6B:
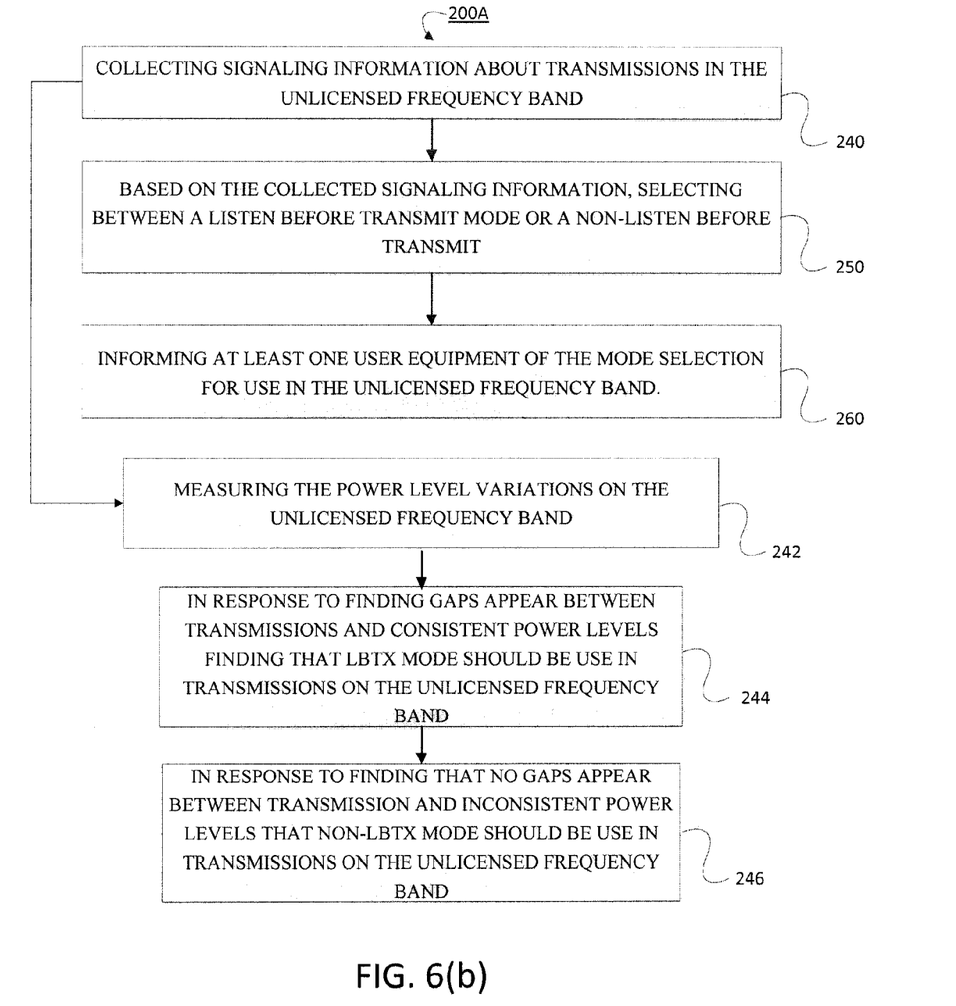

Referring now to FIGS. 6(*a*) and 6(*b*) a logic flow diagram that illustrates the operation of a method, and a result of execution of computer program instructions embodied on a computer readable memory, in accordance with the exemplary embodiments of this invention. The below-described exemplary embodiments are separately numbered for clarity and identification. This numbering should not be construed as wholly separating the below descriptions since various aspects of one or more exemplary embodiments may be practiced in conjunction with one or more other aspects or exemplary embodiments. That is, the exemplary embodiments of the invention, such as those described immediately below, may be implemented, practiced or utilized in any combination (e.g., any combination that is suitable, practicable and/or feasible) and are not limited only to those combinations described herein and/or included in the appended claims.

(1) In one exemplary embodiment, and with reference to FIG. 6(a), a method (200) comprising: receiving information from one or more wireless networks indicating a request for listen before transmit mode or a non-listen before transmit mode (210), in reply, determining whether the one or more wireless networks is to utilize the listen before transmit mode or the non-listen in an unlicensed frequency band (220), and informing the one or more wireless networks of the determined mode (230).

A method as above, further comprising the steps of: determining if coexisting radio systems are operating in the unlicensed frequency band in the location of the one or more user devices (222), compiling and maintaining a database which associates each one or more user devices with each mode selection and location of each coexisting radio systems (223), wherein the apparatus provides a centralized control of unlicensed spectrum for coexistence of wireless communication systems in unlicensed frequency bands.

A method as in any above, implemented as (e.g., performed by) a computer program. A method as in any above, implemented as a computer program stored (e.g., tangibly embodied) on a computer-readable medium (e.g., a program storage device, a memory). A computer program comprising computer program instructions that, when loaded in a processor, perform operations according to one or more (e.g., any one) of the above-described methods. A method as in any above, implemented as a program of instructions tangibly embodied on a program storage device, execution of the program of instructions by a machine (e.g., a processor or a data processor) resulting in operations comprising the steps of the method. A method as in any above, further comprising one or more aspects of the exemplary embodiments of the invention as described elsewhere herein, and, in particular, one or more aspects of the exemplary embodiments of the invention as relating to exemplary methods described herein.

(2) In another exemplary embodiment, a non-transitory computer readable medium storing a program of machine-readable instructions executable by a digital processing, the program comprising: code for, receiving information from one or more wireless networks indicating a request for listen before transmit mode or a non-listen before transmit mode, code for in reply, determining whether the one or more wireless networks is to utilize the listen before transmit mode or the non-listen in an unlicensed frequency band, and code for, informing the one or more wireless networks of the determined mode.

(3) In yet another exemplary embodiment, and with reference to FIG. 6(b), a method (200A) comprising: collecting information about transmissions in an unlicensed frequency band (240), based on the collected information, selecting between a listen before transmit mode and non-listen before transmit mode (250), and informing at least one use equipment of the selected mode for use in the unlicensed frequency band (260).

A method as above, further comprising the step of collecting by a network access node the information and informing the at least one user equipment of the mode selection for use in the unlicensed frequency band.

A method as above, further comprising the steps of: measuring a power level variation of signals received on the unlicensed frequency band (242) and determining if listen before transmit mode or non-listen before transmit mode should be utilized where, in response to finding gaps appear between transmissions and consistent power levels finding that LBTx mode should be use in transmissions on the unlicensed frequency band (244), or in response to finding that no gaps appear between transmission and inconsistent power levels that non-LBTx mode should be use in transmissions on the unlicensed frequency band (246).

A method as above, further comprising the steps of: determining if coexisting radio systems are operating in the unlicensed frequency band in a location of the one or more user equipment, compiling and maintaining a database which associates each one or more device with each devices unlicensed frequency band mode selection and location of each coexisting radio systems, wherein the apparatus provides a centralized control of unlicensed spectrum for coexistence of wireless communication systems in unlicensed frequency bands.

A method as above, where in the case that non-listen before transmit mode is elected, direct the at least one user equipment to implicitly disables channel quality indicator reporting or report only wideband channel quality indicator.

(4) In another exemplary embodiment, a non-transitory computer readable medium storing a program of machine-readable instructions executable by a digital processing, the program comprising: code for, collecting information about transmissions in an unlicensed frequency band, based on the collected information, selecting between a listen before transmit mode and non-listen before transmit mode, and code for, informing at least one use equipment of the selected mode for use in the unlicensed frequency band.

(5) In another exemplary embodiment, an apparatus comprising: at least one processor; and at least one memory including computer program code, the at least one memory and the computer program code being configured to, with the at least one processor, cause the apparatus at least to perform: receive information from one or more wireless networks indicating a request for listen before transmit mode or a non-listen before transmit mode, in reply, determine whether the one or more wireless networks is to utilize the listen before transmit mode or the non-listen in an unlicensed frequency band and inform the one or more wireless networks of the determined mode.

An apparatus as in any above, further comprising one or more aspects of the exemplary embodiments of the invention as described elsewhere herein, and, in particular, one or more aspects of the exemplary embodiments of the invention as relating to exemplary apparatus described herein.

The apparatus, where the apparatus further receives information on the location of one or more user devices.

The apparatus, where in which the at least one memory with the computer program is configured with at least one processor to cause the apparatus to further at least: determine if coexisting radio systems are operating in the unlicensed frequency band in the location of the one or more user devices, compile and maintain a database which associates each one or more user devices with each mode selection and location of each coexisting radio systems, wherein the apparatus provides a centralized control of unlicensed spectrum for coexistence of wireless communication systems in unlicensed frequency bands.

(6) In another exemplary embodiment, an apparatus comprising: at least one processor; and at least one memory including computer program code, the at least one memory and the computer program code being configured to, with the at least one processor, cause the apparatus at least to perform: collect information about transmissions in an unlicensed frequency band, based on the collected information, select between a listen before transmit mode and a non-listen before transmit mode, and inform at least one use equipment of the selection mode for use in the unlicensed frequency band.

An apparatus as in any above, further comprising one or more aspects of the exemplary embodiments of the invention as described elsewhere herein, and, in particular, one or more aspects of the exemplary embodiments of the invention as relating to exemplary apparatus described herein.

The apparatus, in which the apparatus comprises a network access node.

The apparatus, where the collected information is obtained by measuring a power level variation of signals received on the unlicensed frequency band.

The apparatus, where the information is collected from one or more user equipments and comprises information about power level variation on an unlicensed frequency band.

The apparatus, in which the at least one memory with the computer program is configured with the at least one processor to cause the apparatus to further at least: determine if listen before transmit mode or non-listen before transmit mode should be utilized where, in response to finding gaps appear between transmissions and consistent power levels finding that listen before transmit should be use in transmissions on the unlicensed frequency band, or in response to finding that no gaps appear between transmission and inconsistent power levels that non-listen before transmit should be use in transmissions on the unlicensed frequency band.

The apparatus, in which the at least one memory with the computer program is configured with the at least one processor to cause the apparatus to further at least: determine if coexisting radio systems are operating in the unlicensed frequency band in the location of the one or more user equipment, compile and maintain a database which associates each one or more device with each devices unlicensed frequency band mode selection and location of each coexisting radio systems, wherein the apparatus provides a centralized control of unlicensed spectrum for coexistence of wireless communication systems in unlicensed frequency bands.

The apparatus, where in the case that non-listen before transmit mode is elected, direct the at least one user equipment to implicitly disables channel quality indicator reporting or report only wideband channel quality indicator.

The apparatus, where the apparatus broadcasts a mode selection configuration and reconfiguration information in a system information block.

Figure 7:
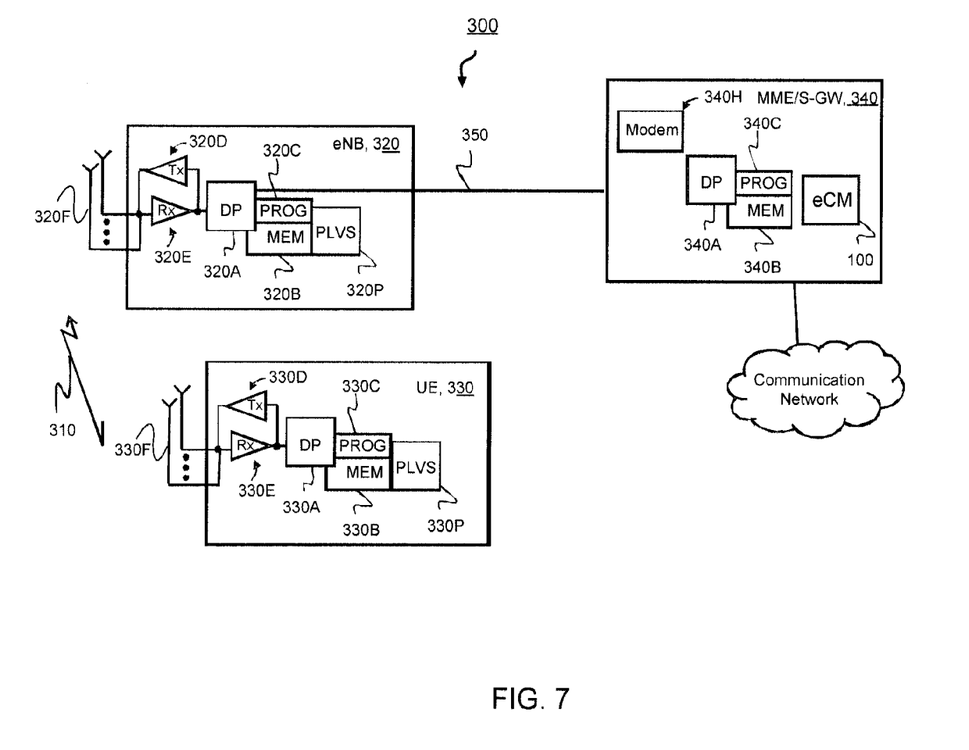
FIG. 7 is a simplified block diagram of various exemplary network devices and electronic devices suitable for use in practicing the exemplary embodiments of the invention.

Reference is now made to FIG. 7 for illustrating a simplified block diagram of various electronic devices and apparatuses that are suitable for use in practicing the exemplary embodiments of this invention. In FIG. 7, a first access node 320 is adapted for communication over a wireless link 310 with a mobile apparatus, such as a mobile terminal or UE 330. The first access node 320 may be a macro eNodeB, a femto eNodeB, or other type of base station (BS) or access point (AP).

For completeness, the UE 330 includes processing means such as at least one data processor (DP) 330A, a storing means such as at least one computer-readable memory (MEM) 330B storing at least one computer program (PROG) 330C, and also a communicating means such as a transmitter TX 330D and a receiver RX 330E for bidirectional wireless communications with the first access node 320 via one or more antennas 330F. UE 330 includes at least one of the PROGs 330C to allow the UE to employ a power level variation sensor 330P to carry out the above described methods and computer program operations to determine whether an unlicensed frequency band is operating in a LBT or non-LBT mode in according with one or more embodiments of the present invention.

The first access node 320 similarly includes processing means such as at least one data processor (DP) 320A, storing means such as at least one computer-readable memory (MEM) 320B storing at least one computer program (PROG) 320C, and communicating means such as a transmitter TX 320D and a receiver RX 320E for bidirectional wireless communications with the UE 330 via one or more antennas 320F. First access node 320 also includes at least one of the PROGs 320C to allow it to employ a power level variation sensor 220P to carry out the above described methods and computer program operations to determine whether an unlicensed frequency band is operating in a LBT or non-LBT mode in according with one or more embodiments of the present invention. Also as shown in FIG. 7 a data and/or control path 350 couples the first access node 320 with a MME/S-GW 340.

MME/S-GW 340 includes processing means such as at least one data processor (DP) 340A, a storing means, such as at least one computer-readable memory (MEM) 340B storing at least one computer program (PROG) 340C, and a communicating means, such as a modem 340H for bidirectional communication with the first access node 320 via the link 350. While not particularly illustrated for the UE 330 or first access node 320, those devices are also assumed to include as part of their wireless communicating means a modem which may be inbuilt on a radiofrequency RF front end chip within those devices 320, 330, 340 and which chip also carries the TX 320D/330D/340D and the RX 320E/330E/340E. The MME/S-GW 340 also has stored in its local memory at 340B the database which it constructs and maintains as detailed above and listing the available unlicensed frequency bands and modes of operation on each unlicensed band whether LBT or non-LBT.

At least one of the PROGs 340C in the MME/S-GW 340 is assumed to include program instructions that, when executed by the associated DP 340A, enable the device to operate in accordance with the exemplary embodiments of this invention, as detailed above. In particular, to allow the MME/S-GW 340 to operate in conjunction with the enhanced coexistence manger (eCM) 100 to determine whether an unlicensed frequency band is operating in a LBT or non-LBT mode in according with one or more embodiments of the present invention.

In these regards, the exemplary embodiments of this invention may be implemented at least in part by computer software stored on the MEM 320B, 330B, 340B which is executable by the DP 340A of the MME/S-GW 340 and/or by the DP 330A/340A of the respective access node 320 or UE 330, or by hardware, or by a combination of tangibly stored software and hardware (and tangibly stored firmware). Electronic devices implementing these aspects of the invention need not be the entire devices as depicted at FIG. 7, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 320B, 330B, 340B include any data storage technology type which is suitable to the local technical environment, including, but not limited to, semiconductor based memory devices, magnetic memory devices and systems, optical memory devices and systems, fixed memory, removable memory, disc memory, flash memory, DRAM, SRAM, EEPROM and the like. Various embodiments of the DPs 320A, 330A and 340A include, but are not limited to, general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

What is claimed is:

1. An apparatus, comprising:
circuitry configured to
    collect information about transmissions in an unlicensed frequency band, the collected information including user equipment mode preference and macro cell location;
    select between a listen before transmit mode and a non-listen before transmit mode based on the collected information; and
    inform at least one user equipment of the selected mode for use in the unlicensed frequency band by transmitting mode selection information in a Long Term Evolution-Advanced (LTE-A)-compliant system information block (SIB).

2. The apparatus according to claim 1, wherein the apparatus is a network access node.

3. The apparatus according to claim 2, wherein the collected information is obtained by measuring a power level variation of signals received on the unlicensed frequency band.

4. The apparatus according to claim 1, wherein the information is collected from one or more user equipments and comprises information indicating power level variation on the unlicensed frequency band.

5. The apparatus according to claim 3, wherein the selection between the listen before transmit mode and the non-listen before transmit mode comprises:
    selecting the listen before transmit mode for transmission on the unlicensed frequency band in response to identifying that gaps appear between transmissions and consistent power levels, or
    selecting the non-listen before transmit mode for transmission on the unlicensed frequency band in response to identifying that no gaps appear between transmission and inconsistent power levels.

6. The apparatus according to claim 1, wherein the circuitry is configured to:
    determine if coexisting radio systems are operating in the unlicensed frequency band in the location of the at least one user equipment; and
    compile and maintain a database associating each of the at least one user equipment with each respective user equipment's unlicensed frequency band mode selection and location of each coexisting radio systems.

7. The apparatus according to claim 1, wherein in a case that the apparatus does not have a capability to measure transmission patterns in the unlicensed frequency band, the apparatus configures the user equipment to:
    operate in the selected one of the listen before transmit mode and the non-listen before transmit mode; and
    based on performance in the selected mode, subsequently change to the other of the listen before transmit mode and the non-listen before transmit mode.

8. The apparatus according to claim 7, wherein
the performance is measured over a defined time window over which the apparatus determines accuracy of one or more channel quality indications, and
the subsequent change to the other mode occurs in a next period in a case that the one or more channel quality indications are determined to be not accurate.

9. An apparatus, comprising:
circuitry configured to
    collect information about transmissions in an unlicensed frequency band, the collected information including user equipment mode preference and macro cell location;
    select between a listen before transmit mode and a non-listen before transmit mode based on the collected information;
    inform the at least one user equipment of the selected mode for use in the unlicensed frequency band; and
    direct the at least one user equipment to disable channel quality indicator reporting for the unlicensed frequency band or report only a wideband channel quality indicator in a case that the non-listen before transmit mode is selected.

10. The apparatus according to claim 9, wherein
the apparatus broadcasts a mode selection information in a Long Term Evolution-Advanced (LTE-A)-compliant system information block (SIB).

11. The apparatus according to claim 9, wherein
the collected information about transmissions in an unlicensed frequency band includes information corresponding to a measurement of power level in the unlicensed band.

12. The apparatus according to claim 11, wherein
the circuitry is configured to select the listen before transmit mode for transmission on the unlicensed frequency band in a case that gaps between transmissions and consistent power levels are identified based on the collected information.

13. The apparatus according to claim 11, wherein
the circuitry is configured to select the non-listen before transmit mode for transmission on the unlicensed frequency band in a case that no gaps appear between transmission and inconsistent power levels based on the collected information.

14. A method, comprising:
collecting information about transmissions in an unlicensed frequency band, the collected information including user equipment mode preference and macro cell location;
selecting between a listen before transmit mode and non-listen before transmit mode based on the collected information; and
informing at least one user equipment of the selected mode for use in the unlicensed frequency band by transmitting mode selection information in a Long Term Evolution-Advanced (LTE-A)-compliant system information block (SIB).

15. The method according to claim 14, further comprising:
collecting by a network access node the information about transmissions in an unlicensed frequency band.

16. The method according to claim 14, further comprising:
- measuring a power level variation of signals received on the unlicensed frequency band; and
- determining that the listen before transmit mode should be used for transmissions on the unlicensed frequency band in response to identifying that gaps appear between transmissions and consistent power levels, or
- determining that the non-listen before transmit mode should be used for transmissions on the unlicensed frequency band in response to finding that no gaps appear between transmission and inconsistent power levels.

17. The method according to claim 14, further comprising:
- determining if coexisting radio systems are operating in the unlicensed frequency band in a location of the at least one user equipment; and
- compiling and maintaining a database associating each of the at least one user equipment with each respective user equipment's unlicensed frequency band mode selection and location of each coexisting radio systems.

18. The method according to claim 14, further comprising:
- directing the at least one user equipment to disable channel quality indicator reporting for the unlicensed band or report only a wideband channel quality indicator in a case that the non-listen before transmit mode is selected.

19. An apparatus comprising:
circuitry configured to
- collect information about transmissions in an unlicensed frequency band, the collected information including user equipment mode preference and macro cell location;
- select between a listen before transmit mode and a non-listen before transmit mode based on the collected information; and
- inform at least one user equipment of the selected mode for use in the unlicensed frequency band via dedicated Radio Resource Control (RRC) and/or Medium Access Control (MAC) signaling to each of the at least one user equipment via cellular transmissions on the licensed band.

20. A method comprising:
- collecting information about transmissions in an unlicensed frequency band, the collected information including user equipment mode preference and macro cell location;
- selecting between a listen before transmit mode and non-listen before transmit mode based on the collected information; and
- informing the at least one user equipment of the selected mode for use in the unlicensed frequency band via dedicated Radio Resource Control (RRC) and/or Medium Access Control (MAC) signaling to each of the at least one user equipment via cellular transmissions on a licensed band.

* * * * *

UNITED STATES PATENT AND TRADEMARK OFFICE
CERTIFICATE OF CORRECTION

PATENT NO.         : 9,467,866 B2
APPLICATION NO.    : 14/365167
DATED              : October 11, 2016
INVENTOR(S)        : Xinying Gao et al.

Page 1 of 1

It is certified that error appears in the above-identified patent and that said Letters Patent is hereby corrected as shown below:

In the Claims

Column 13, Line 32, Claim 2, change "node" to --mode--.

Signed and Sealed this
Twelfth Day of June, 2018

Andrei Iancu
*Director of the United States Patent and Trademark Office*